United States Patent [19]

Braun

[11] Patent Number: 5,097,724
[45] Date of Patent: Mar. 24, 1992

[54] AUTOMATIC MECHANICAL TRANSMISSION START CONTROL SYSTEM

[75] Inventor: Eugene R. Braun, Royal Oak, Mich.

[73] Assignee: Eaton Corporation, Cleveland, Ohio

[21] Appl. No.: 600,657

[22] Filed: Oct. 22, 1990

Related U.S. Application Data

[63] Continuation-in-part of Ser. No. 337,989, Apr. 14, 1989, abandoned.

[51] Int. Cl.$^5$ .............................................. B60K 41/06
[52] U.S. Cl. ........................................ 74/866; 74/846; 192/0.076; 192/4 A
[58] Field of Search .................. 74/846, 857, 859, 860, 74/866, 873, 875, 874; 192/0.072, 0.076, 0.094, 4 A, 13 R

[56] References Cited

U.S. PATENT DOCUMENTS

| | | | |
|---|---|---|---|
| 2,713,273 | 7/1955 | Ebsworth | 74/846 |
| 3,069,925 | 12/1962 | Roche | 74/846 X |
| 3,083,588 | 4/1963 | Christenson | 74/846 X |
| 3,426,872 | 2/1969 | Iric et al. | 192/0.094 |
| 4,105,101 | 8/1978 | Förster et al. | 192/4 A |
| 4,497,395 | 2/1985 | Nogami et al. | 192/4 A |
| 4,513,638 | 4/1985 | Nishikawa et al. | 74/866 |
| 4,618,043 | 10/1986 | Hattori et al. | 192/0.052 |
| 4,784,020 | 11/1988 | Hamano et al. | 74/866 |
| 4,899,857 | 2/1990 | Tateno et al. | 192/0.072 |

*Primary Examiner*—Leslie A. Braun
*Assistant Examiner*—Benjamin Levi
*Attorney, Agent, or Firm*—A. E. Chrow

[57] ABSTRACT

Preferred embodiments of a mechanical transmission start control system are provided which employ a central processing unit (10) operative to process signals indicative of throttle foot pedal position (26); engine speed (20); transmission input speed (14); and transmission output speed (16), and to control either or both the degree of clutch or friction coupling and brake engagement in a manner predetermined to provide smooth start-up when vehicle speed is less than a predetermined value "K".

27 Claims, 8 Drawing Sheets

AUTOMATIC MECHANICAL TRANSMISSION START CONTROL SYSTEM

This application is a continuation-in-part of abandoned Ser. No. 337,989 filed Apr. 14, 1989, now abandoned.

INTRODUCTION

This invention relates generally to a vehicular automatic transmission control system effective to provide a substantially smooth start-up from a stopped or virtually stopped condition and more particularly to such control system including means for instructing the vehicle brakes to assume a predetermined partially engaged condition in combination with means for instructing a frictional coupling to establish a predetermined partially engaged condition between the transmission and the vehicle engine.

BACKGROUND OF THE INVENTION

A variety of approaches have been taken over the years to prevent a vehicle having an automatic transmission from creeping when in a stopped condition with the transmission in neutral with the engine running and to provide a smooth start-up from a stopped or virtually stopped condition.

A system that employs a mechanism for raising the idling speed of the engine during warm-up and also for automatically disengaging or partially disengaging the clutch when the brakes are applied at the lowest speed is described in U.S. Pat. No. 4,105,101, the disclosure of which is incorporated herein by reference.

A somewhat similar concept is disclosed in U.S. Pat. No. 4,194,608, of which the disclosure is incorporated herein by reference, teaches a means by which to adjust throttle position when the clutch assembly uncouples the transmission from the engine.

U.S Pat. No. 4,513,638, the disclosure of which is incorporated herein by reference, discloses a system that prevents the clutch from coupling the transmission to the engine when the throttle valve is in idle and the gear shift is moved from neutral to another position.

A system for reducing torque applied to an automatic transmission when the engine is idling is disclosed in U.S. Pat. No. 4,514,811, the disclosure of which is incorporated herein by reference.

Other examples of systems for controlling creep and/or enhancing smoothness in start-up of vehicles having automatic transmissions are disclosed in U.S. Pat. Nos. 4,579,202; 4,618,043; 4,4698,763; 4,711,141; and 4,714,144, the disclosures of all of which are incorporated herein by reference.

Although the control systems disclosed in the above-described references may have their particular advantages, they characteristically employ means for automatically disengaging or partially engaging the clutch often in combination with some type of fuel control to maintain a desired idling speed and, although the previously described mechanism in U.S. Pat. No. 4,105,101 utilizes partial disengagement of the vehicle brakes as a smoothing function, such is done only in conjunction with idle speed control and does not include the advantage of partial clutch engagement.

SUMMARY OF THE INVENTION

It has been discovered that a balancing between the degree of clutch engagement and the amount of force applied to the brakes in combination with automatic fuel adjustment operates to great advantage in controlling creep and providing smooth start-up of vehicles employing automatic transmissions that has long been recognized by those skilled in the art.

Accordingly, it is an object of this invention to provide a system for controlling creep and providing smooth start-up for vehicles having automatic transmissions.

It is another object of this invention to provide a vehicular automatic transmission control system that controls degree of brake and clutch engagement to control creep and enhance smoothness of start-up.

It is still another object of this invention to provide a vehicular automatic transmission control system that balances the degree of clutch engagement against the degree of braking in combination with automatic engine idle speed adjustment to control creep and enhance smoothness of start-up.

It is yet another object of this invention to provide a vehicular automatic transmission control system that determines the amount of clutch engagement for starting smoothness by causing the engine speed to drop a predetermined amount with brakes automatically applied or maintained.

DESCRIPTION OF SOME PREFERRED EMBODIMENTS

Figure 1:
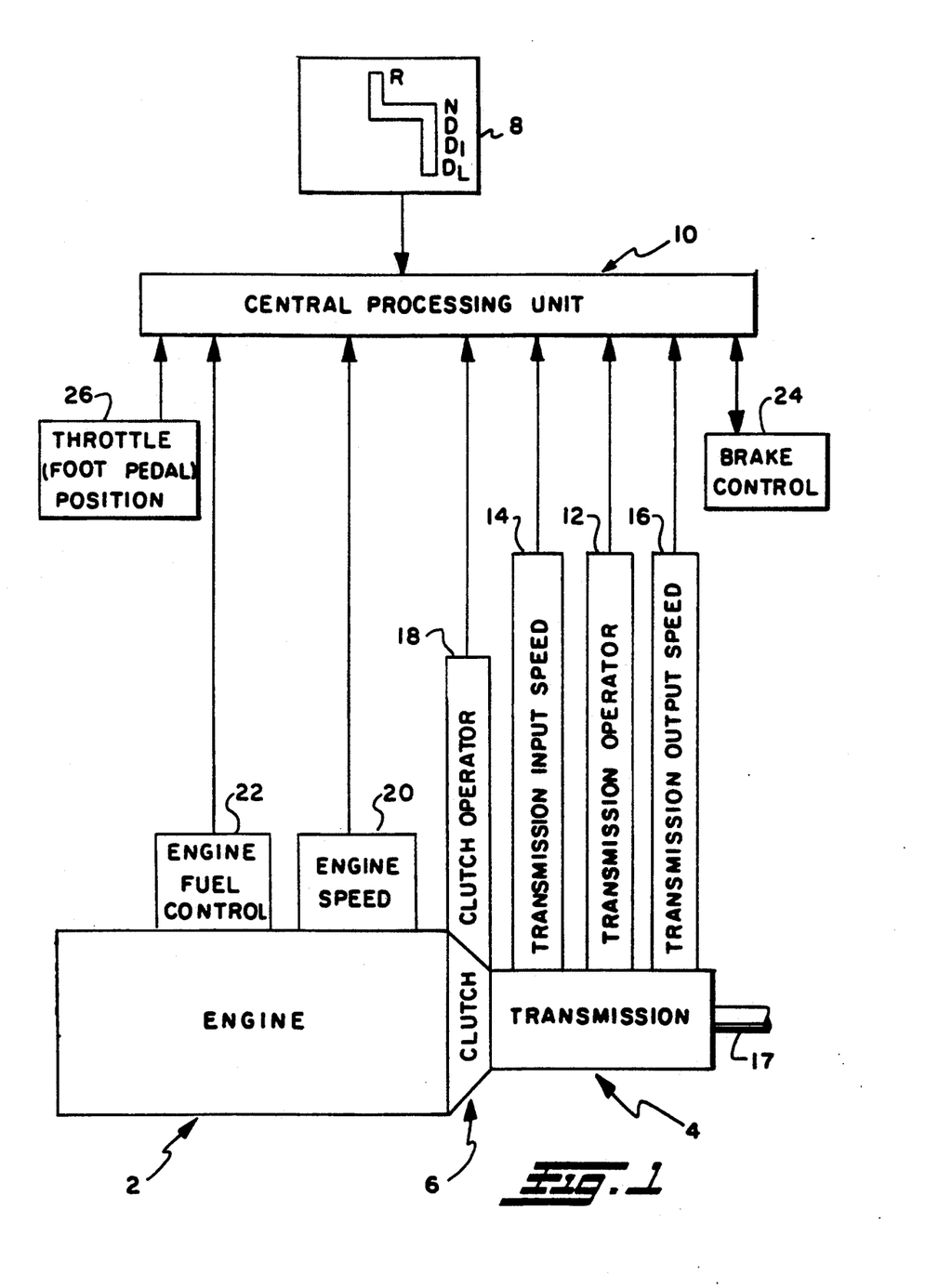
FIG. 1 is a schematic illustration of the components and interconnections of the automatic mechanical transmission control system of the invention.

In FIG. 1, a vehicular engine 2, such as an internal combustion gasoline or diesel engine, is operative to drive an output shaft 17 of an automatic mechanical transmission 4 which is selectively coupled to engine 2 by means of frictional coupling or clutch 6.

Output shaft 17 is operatively connected to the vehicle drive wheels by means of an axle differential or the like causing the wheels to rotate and move the vehicle in response to rotation of output shaft 17.

Output shaft 17 is caused to rotate when transmission 4 is coupled to engine 2 by clutch 6. The rotational speed and direction in which the output shaft 17 rotates is governed by the particular change gear ratio of transmission 4 engaged at the time.

The change gear ratio is selected by an operator by positioning a knob or the like, not shown, at R (reverse) or at progressively increasing drive ratios denoted as $D_L$, $D_1$, and D or in N (neutral) when so selected not to be in gear.

Generally, the control system of the invention is operative to prevent the vehicle from creeping when the transmission is in neutral and the engine is idling by ensuring that frictional coupling or clutch 6 is in a fully disengaged condition. Additionally, the control system of the invention is operative to ensure smooth starting conditions at vehicle speeds less then a predetermined value K hereinafter described with respect to FIGS. 2-8. The automatic partial engagement of clutch 6 with the automatic engagement of the brakes takes the backlash out of the driveline to contribute to the smoothness of the start. Additionally, the automatic release of the brakes at a predetermined rate allows for a smooth vehicle start.

The control system of the invention includes a central processing unit 10 operative to provide output signals to brake control or actuation means 24 and to effect gear ratio selections in transmission 4 as well as adjust engine fuel control 22 in addition to controlling operation of clutch 6.

In order to provide the necessary output signals, central processing unit 10 receives input signals from transmission output speed sensor 16, and from brake control 24, and from transmission input shaft speed sensor 14, as well as from engine speed sensor 20, and engine fuel control 22, and optionally from throttle foot pedal position sensor 26.

Central processing unit 10 is operative to receive and process the input signals to provide output signals operative to coordinate idle speed adjustment and the degree of brake and clutch engagement required to minimize creep and provide smooth operation at low speed.

The particular sensor employed for providing the input signals to processing unit 10 and the mechanism for controlling the degree of clutch and brake engagement are well known in the art and are therefore not described in detail herein.

Automatic and semi-automatic transmission systems of the type illustrated in FIG. 1 may be seen in greater detail by reference to U.S. Pat. Nos. 4,361,060; 4,595,986; 4,722,248 and 4,648,290, the disclosures of which are incorporated herein by reference.

The logic path or pattern for the control system of the invention however uniquely combines parameters heretofore not brought together in toto and is therefore described herein in detail with respect to FIGS. 2 through 8.

Figure 2:
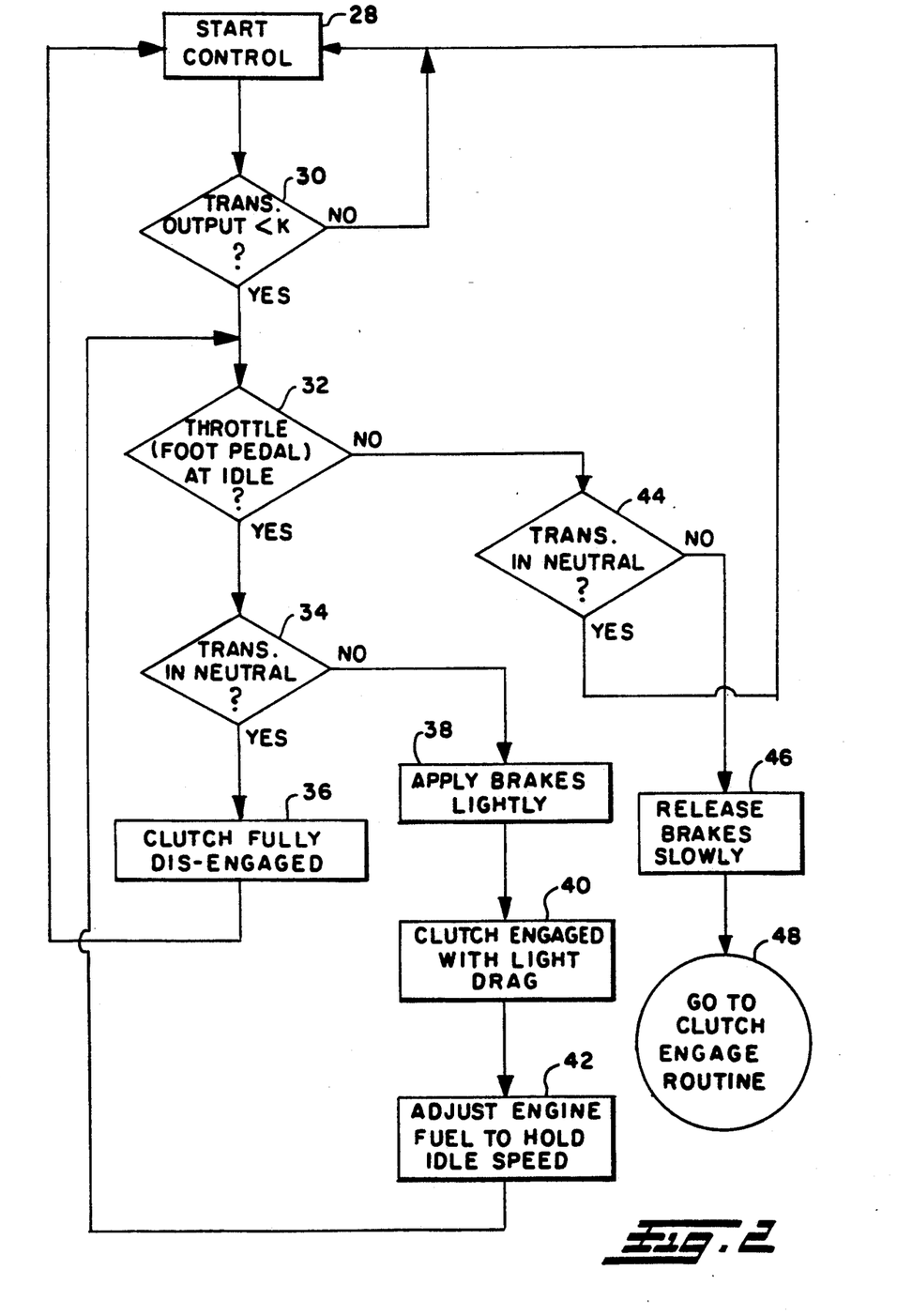
FIGS. 2-8 are respective schematic illustrations of alternate embodiments of the automatic mechanical transmission control system of the invention in flow chart form.

FIG. 2 illustrates the logic pattern by which processing unit 10 processes various input signals to provide the output signals required to minimize creep and provide smooth driving conditions at low speeds.

Start-up control 28 is governed first in operation or step 30 by determining if vehicle speed is less than a predetermined value K, which, for example, may be 3 miles per hour.

If the answer is no, then vehicle speed is above the predetermined threshold value at which the system of the invention is operative to control.

If the answer is yes, it is determined in step 32 whether throttle foot pedal position 26 is in an idle position. If yes, it is determined in step 34 whether the transmission is in neutral. If yes, unit 10 provides an output signal operative to cause the friction coupling or clutch 6 to assume a fully disengaged condition as referenced by numeral 36.

In the event it is determined in step 34 that the transmission is not in neutral, unit 10 provides an output signal operative to cause the brake actuation means 38 to apply the brakes lightly which may be described as causing the brakes to assume a predetermined partially engaged condition.

Additionally, unit 10 provides an output signal effective to cause the clutch to engage with a light drag as referenced by numeral 40 or otherwise described as causing the clutch to assume a predetermined partially engaged condition that is adapted to smooth travel at speeds below threshold valve K by unit 10 additionally providing an output signal that is effective to adjust engine fuel as referenced by numeral 42 to hold idle speed at a predetermined value and then recycle into the logic program as indicated by the arrow presuming that the vehicle speed remains below threshold value K.

In some cases, the amount of clutch engagement is determinable by the amount of engine speed drop or by the degree of engine fuel adjustment. The clutch engagement can thus be stopped when the engine speed decreases a predetermined amount. Alternately, the clutch engagement can be stopped when the engine fuel adjustment to maintain a predetermined engine speed has reached a predetermined value.

If the engine has an idle speed governor, fuel will be adjusted to maintain idle speed and operation or step 42 would not be required in the system.

In the event it is determined in step 32 that the throttle foot pedal is not in an idle position, then it is determined in step 44 whether the transmission is in neutral and, if yes, the cycle is restarted at reference numeral 28 as shown by the arrow or, if not, unit 10 provides an output signal that, in step 46, is effective to cause the brake actuation means to release or disengage the brakes slowly or, as may be otherwise described, as at a predetermined rate after which the start control system will return to the automatic transmission clutch engagement routine of which many are known to those skilled in the art such as the routine disclosed in U.S. Pat. No. 4,081,065, the disclosure of which is incorporated herein by reference.

Thus, the control system of the invention operates to (1) fully disengage the clutch when vehicle speed is below a threshold value K and the throttle is at idle and the transmission is in neutral and; (2) apply the brakes and clutch lightly and adjust idle speed to provide smooth operation when vehicle speed is less than predetermined threshold value K and the throttle is initially in an idle position and the transmission is not in neutral and; (3) to release the brakes slowly at a predetermined rate when applied and the vehicle speed is less than predetermined threshold value K and the throttle is not at idle and the transmission is not in neutral and then return to the clutch engagement routine as shown in FIG. 2.

Figure 3:
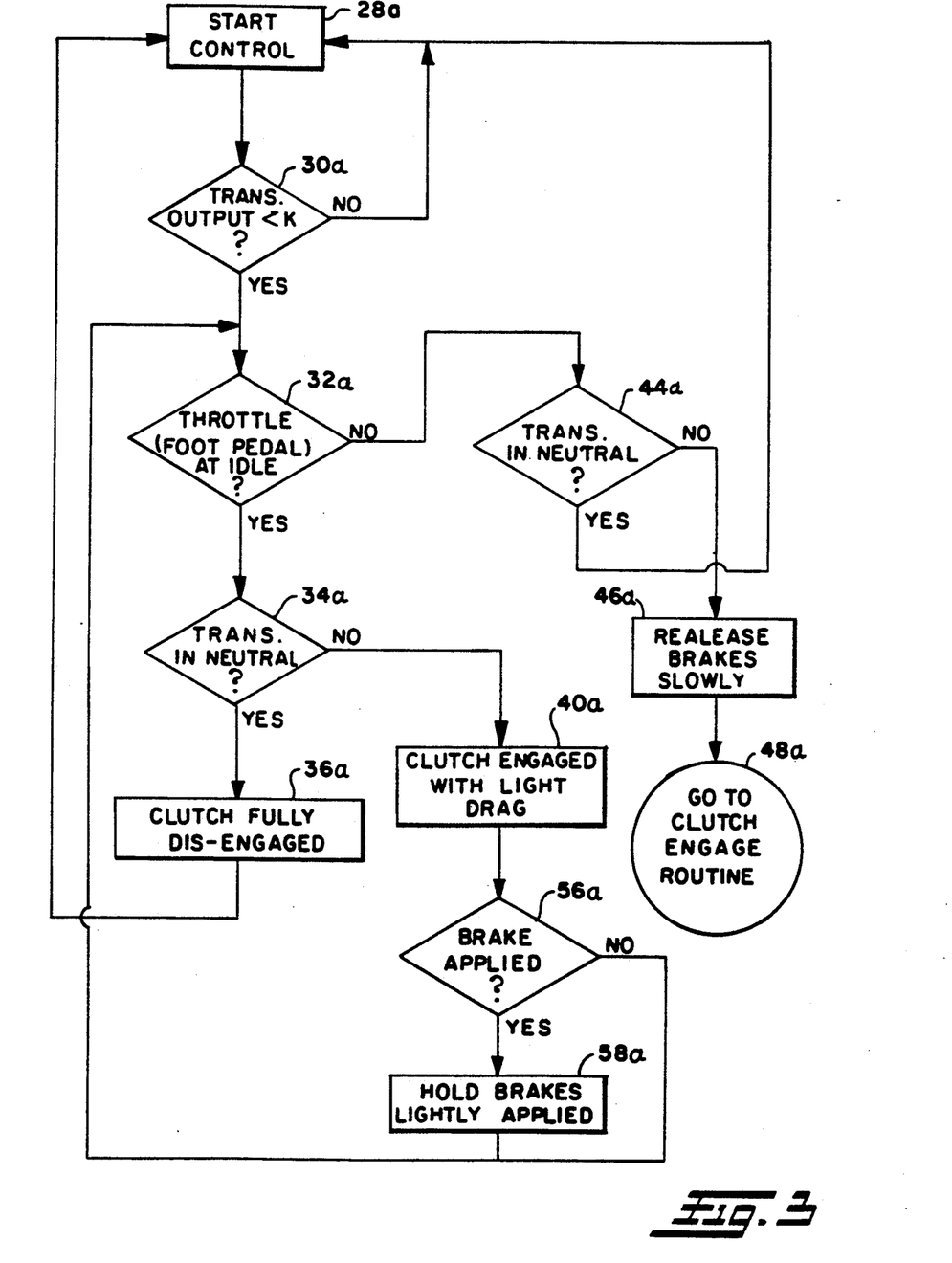

An alternative system is provided by omitting the clutch lightly applied condition at step 40 in favor of the condition that whenever the throttle foot pedal is moved from idle, the clutch is lightly applied and the brakes released slowly Another embodiment of the control system of the invention is shown in FIG. 3 in which the numerals carry the postscript "a" and in which comparison will show operates in essentially the same manner as the system of FIG. 2 except that instead of the sequence of steps 38, 40 and 42, the clutch is again engaged with light drag in step 40a and a determination is made in step 56a as to whether the brakes are in engaged condition and, if yes, unit 10 provides an output signal effective to cause the brake actuation means to hold the brakes in a lightly applied condition as referenced by numeral 58a and, if not, to return to the logic program as shown by the arrow in FIG. 3 unless the vehicle speed has climbed above the predetermined value K which, as previously described, is a speed preferably below about 3 miles per hour.

Figure 4:
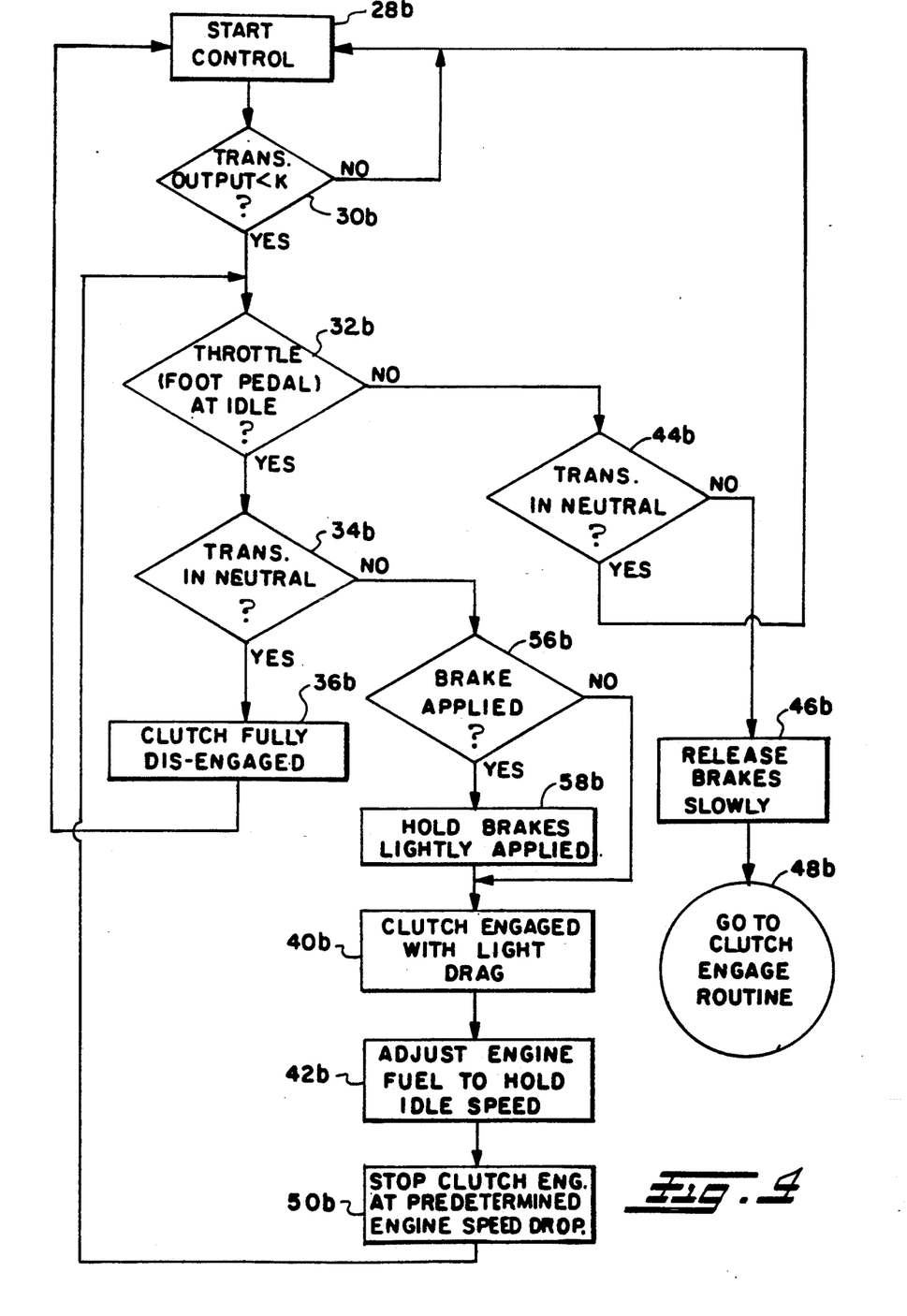

FIGS. 4-8 show other preferred embodiments of the control system of the invention such as in FIG. 4, where the numerals include the postscript "b" and the steps are essentially the same as those shown in FIG. 2 except for the addition of step 50b following step 42b in which the clutch engagement is stopped at a predetermined engine speed drop. Prior to returning the step sequence to the step referenced by numeral 32b. The steps of the process of the invention shown in FIG. 5 carry the postscript "c" and are the same as FIG. 2 through the step referenced by numeral 38c but instead of proceeding to step 40 as in FIG. 2, is referred directly back to step 32c. Additionally, it differs from the system of FIG. 2 when the transmission is determined not to be in neutral in step 44c by proceeding through the sequential steps of engaging the clutch with light drag in step 52c; decreasing the engine speed a predetermined amount in step 54c; adjusting engine fuel to hold idle spaced in step 42c; increasing engine fuel control by a predetermined amount in step 62c; stopping clutch engagement in step 60c; and then releasing the brakes slowly in step 46c; and finally returning to the clutch engage routine in step 48c. The control system shown in FIG. 6, in which the steps carry the postscript "d", is similar to the control system of FIG. 3, except that when the transmission is determined not to be in neutral in step 34d, a determination is made in step 56d on whether the brakes are in an applied condition and, if no, the clutch is engaged until the engine speed drops in step 62d afterwhich the engine fuel is adjusted to hold idle speed in step 42d and then the clutch engagement is stopped in step 60d before re-entering the control sequence at step 32d.

Figure 7:
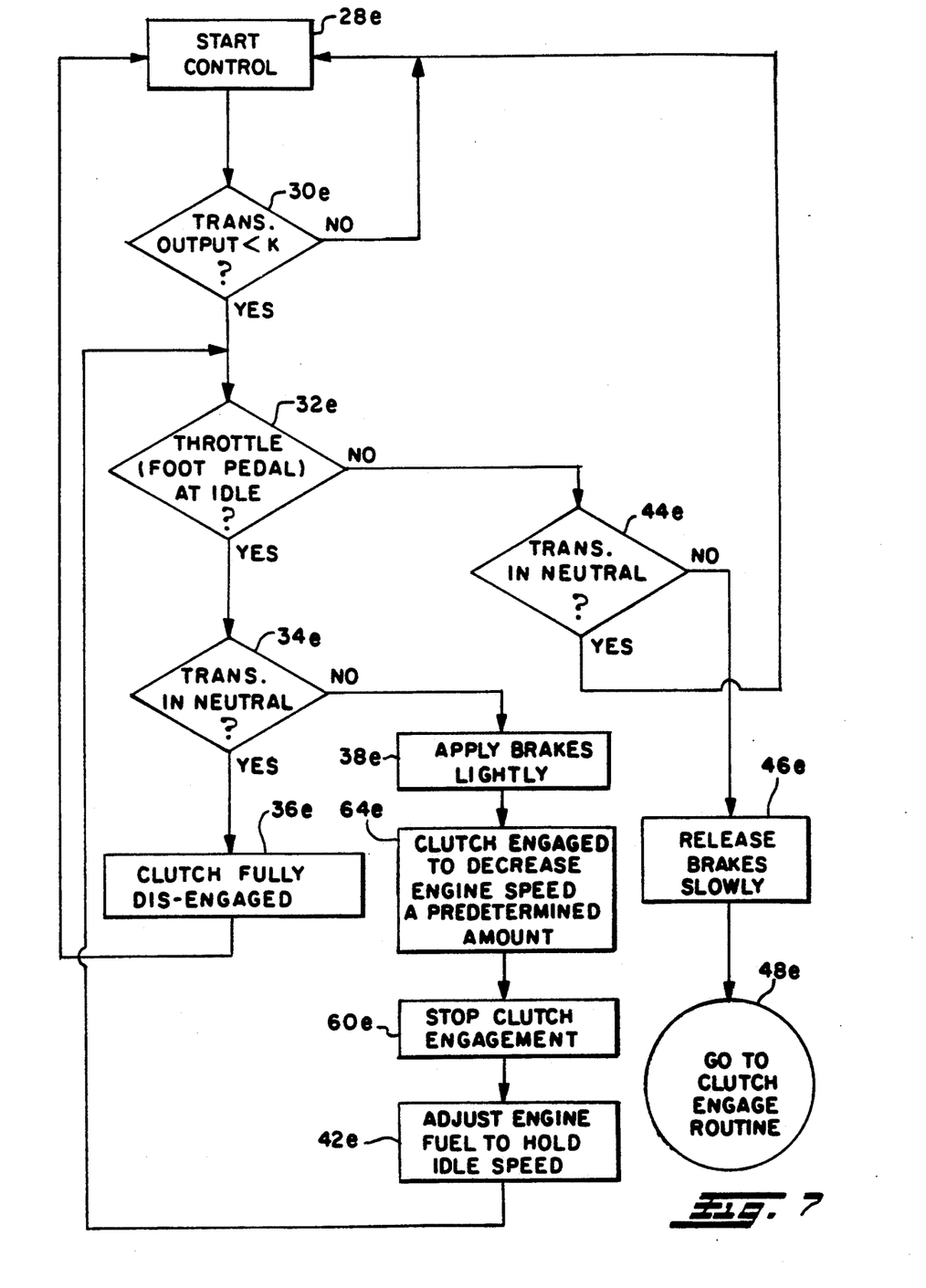

The control system of FIG. 7 in which the reference numerals carry the postscript "e" is similar to the system of FIG. 2 except that, after the brakes have been lightly applied in step 38e, the clutch is then engaged to decrease engine speed a predetermined amount in step 64e afterwhich the clutch engagement is then stopped in step 60e before adjusting engine fuel to hold idle speed in step 42e prior to returning to step 32e.

Figure 5:
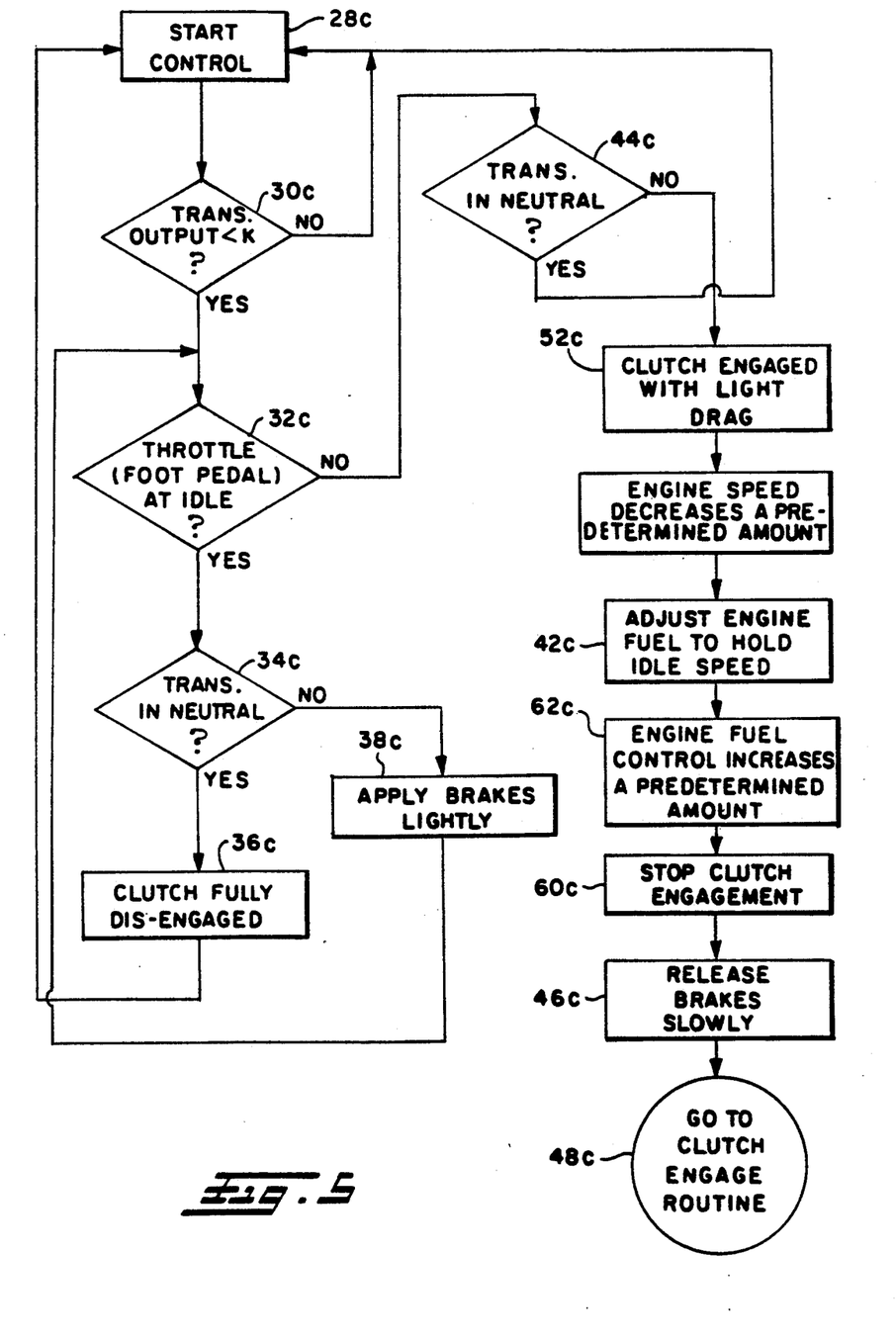
Figure 6:
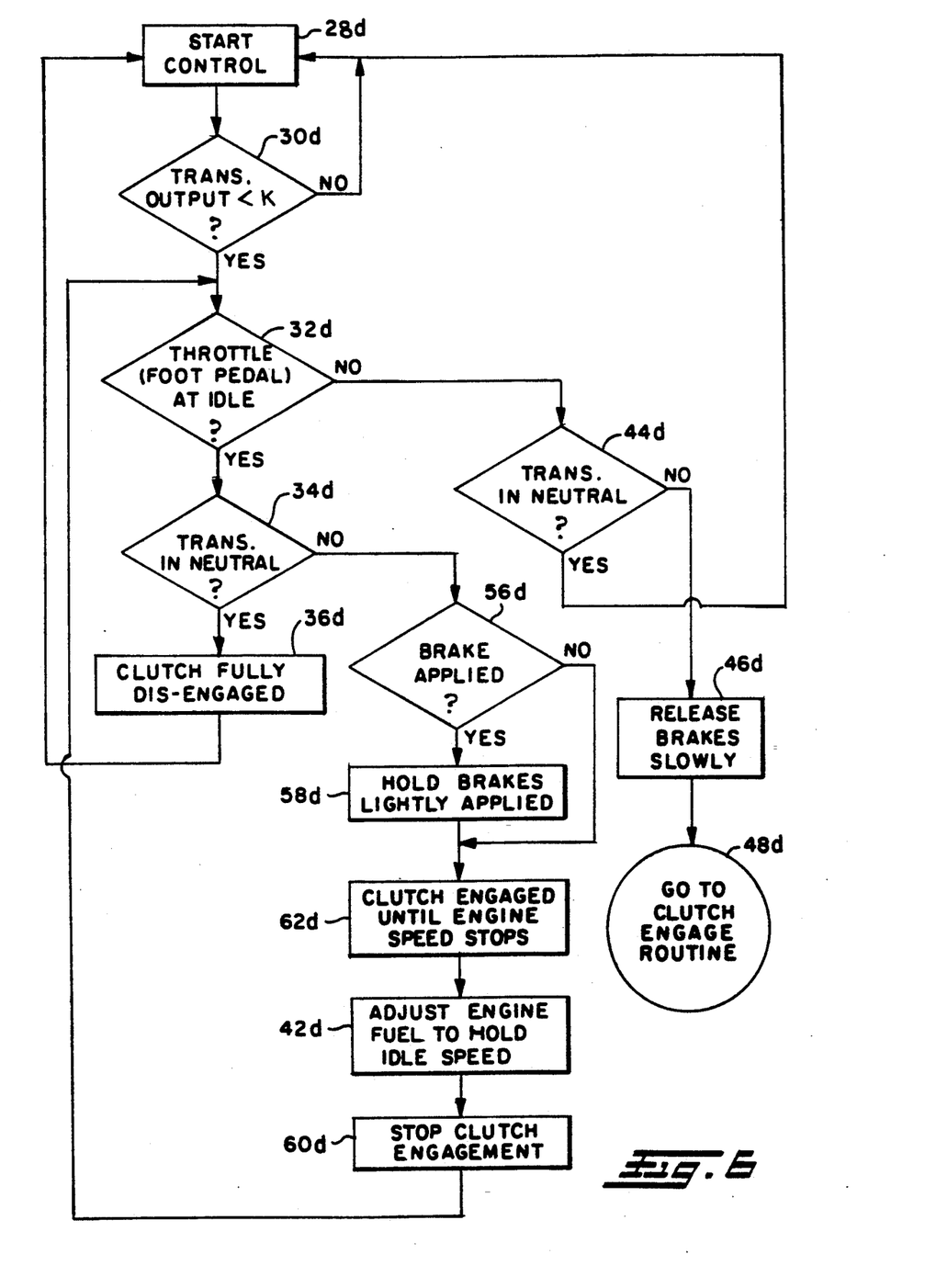
Figure 8:
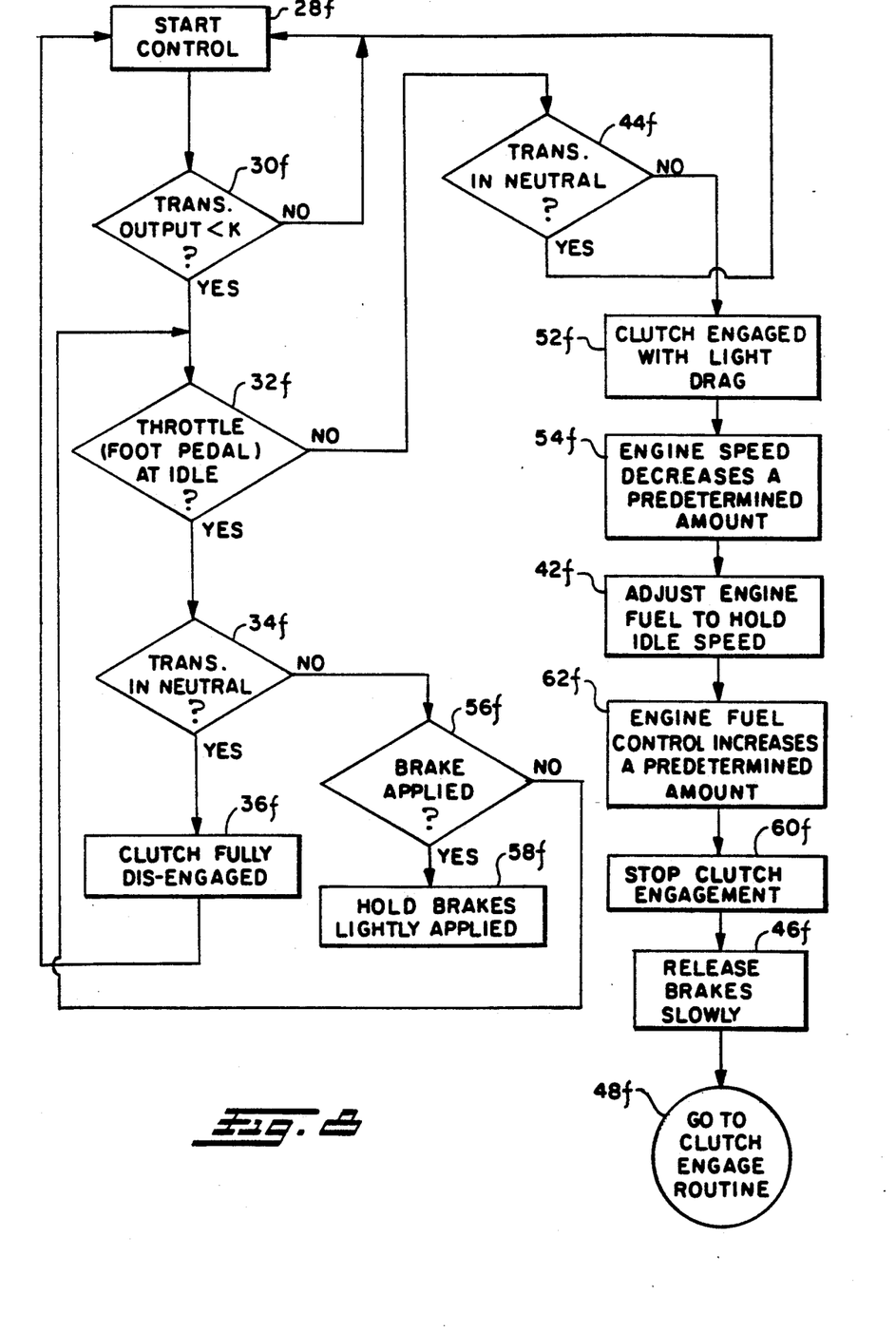

The system of FIG. 8 in which the numerals carry the postscript "f" is similar to the system previously described for FIG. 5 except that, when the transmission has been determined not to be in neutral in step 34f, a determination is made on whether the brakes have been applied in step 56f and, if yes, they are held in a lightly applied condition in step 58f prior to returning to step 32f and, if no, then the system returns directly to step 32f rather than to step 58f as shown in FIG. 8.

Truck tractor air brake systems are well known in the art. One way to interface the start control system of the invention with the brake system is to add brake control valving to one of the foot pedal brake valve exhaust ports which are normally open when the driver takes his or her foot off the brake foot pedal connected to the brake valve. The brake control valving will normally open the brake valve exhaust port above a predetermined low vehicle speed so the brake system works in the ordinary way without interference from the start control system of the invention. Below the predetermined low vehicle speed when the start control is operative, the brake control valving of the start control system will introduce a predetermined low air pressure into one of the foot pedal brake valve exhaust ports to apply the brakes lightly when required by the start control system of the invention. If the driver wants more braking pressure he or she will get it by depressing the pedal and supplying higher brake air pressure from the brake system air supply. The start control system of the invention will not be operative until the fuel (throttle) pedal is depressed which will normally not take place until the driver has released the brake pedal. If the driver releases the pedal the brake air pressure will fall to the predetermined low air pressure until the start control system of the invention releases the brakes gradually by opening the foot pedal brake valve exhaust slowly.

Although the present invention has been set forth with a certain degree of particularity, it is understood that various modifications are possible without departing from the spirit and scope of the invention as hereinafter claimed.

What is claimed is:

1. An automatic mechanical transmission start control system for vehicles having brakes and a throttle controlled engine, said transmission having a plurality of gear ratio combinations selectively engageable between a transmission output shaft and a transmission input shaft operatively connected to the engine by means of a selectively engageable and disengageable friction coupling, said system including an automatic friction coupling actuating member, a throttle control member, an automatic vehicle brake actuating member, an operator positional change gear selector member, including a neutral position and positions in which said gear ratio combinations are selectively engaged, and an information processing unit having means for receiving a plurality of signals including: (1) an input signal indicative of the position of said throttle control member or of the amount of fuel supplied to the engine; (2) an input signal indicative of vehicle speed; (3) an input signal indicating when the transmission is in neutral, said processing unit including means for processing said input signals and providing an output signal therefrom such that, when the vehicle speed signal is less than a predetermined value, said start control system is operative such that, (i) when the transmission is in neutral and the throttle is at idle the output signal is effective to instruct the coupling actuating member to cause the friction coupling to assume a disengaged condition and (ii) when the transmission is not in neutral and the throttle is at idle the output signal is effective to instruct the brake actuating member to cause the brakes to assume a predetermined partially engaged condition and (iii) when the throttle is at idle and the transmission is not in neutral, the output signal is effective to instruct the friction coupling actuating member to cause the friction coupling to assume a partially engaged condition.

2. The control system of claim 1 wherein the output signal is further effective to instruct the throttle control member to adjust the fuel as necessary to hold the engine at a predetermined idle speed.

3. The control system of claim 1 such that, when the throttle is at idle and the transmission is not in neutral, the output signal is further effective to instruct the friction coupling actuating member to cause the friction member to assume an engaged condition operative to decrease the engine speed a predetermined amount.

4. The control system of claim 3 wherein the output signal is further effective to instruct the friction coupling actuating member to cause the friction coupling to stop engagement.

5. The control system of claim 4 wherein the output signal is further effective to instruct the throttle control member to adjust the fuel as necessary to hold the engine at a predetermined idle speed.

6. The control system of claims 2, 3, 4 or 5 further operative such that, when the throttle is not at idle and the transmission is not in neutral, the output signal is effective to instruct the brake actuating member to cause the brakes to disengage at a predetermined rate.

7. The control system of claim 6 wherein the output signal is further effective to instruct the friction coupling actuating member to cause the friction coupling to assume a fully engaged condition.

8. An automatic mechanical transmission start control system for vehicles having brakes and a throttle controlled engine, said transmission having a plurality of gear ratio combinations selectively engageable between a transmission output shaft and a transmission input shaft operatively connected to the engine by means of a selectively engageable or disengageable friction coupling, said system including an automatic friction coupling actuating member, a throttle control member, an automatic vehicle brake actuating member, an operator positional change gear selector member, including a neutral position and positions in which said gear ratio combinations are selectively engaged, and an information processing unit having means for receiving a plurality of signals including: (1) an input signal indicative of the position of said throttle control member or of the amount of fuel supplied to the engine; (2) an input signal indicative of vehicle speed; (3) an input signal indicating when the transmission is in neutral, said processing unit including means for processing said input signals and providing an output signal therefrom such that, when the vehicle speed signal is less than a predetermined value, said start control system is operative such that, (i) when the transmission is in neutral and the throttle is at idle the output signal is effective to instruct the coupling actuating member to cause the friction coupling to assume a disengaged condition and (ii) when the transmission is not in neutral and the throttle is at idle the output signal is effective to instruct the friction coupling actuating member to cause the friction coupling to assume a predetermined partially engaged condition, such that when the throttle is at idle and the transmission is not in neutral and the brakes are in an engaged condition, the output signal is further effective to instruct the brake actuating member to cause the brakes to assume a predetermined partially engaged condition.

9. The control system of claim 8 further operative such that, when the throttle is not at idler and the transmission is not in neutral, the output signal is effective to instruct the brakes actuating member to cause the brakes to disengage at a predetermined rate.

10. The control system of claim 9 wherein the output signal is further effective to instruct the friction coupling actuating member to cause the friction coupling to assume a fully engaged condition.

11. An automatic mechanical transmission start control system for vehicles having brakes and a throttle controlled engine, said transmission having a plurality of gear ratio combinations selectively engageable between a transmission input shaft operatively connected to the engine by means of a selectively engageable and disengageable friction coupling actuating member, an automatic vehicle brake actuating member, a throttle control member, an operator positional change gear selector member, including a neutral position and positions in which said gear ratio combinations are selectively engaged, and an information processing unit having means for receiving a plurality of signals including: (1) an input signal indicative of the position of said throttle control member or of the amount of fuel supplied to the engine; (2) an input signal indicative of vehicle speed; (3) an input signal indicating when the transmission is in neutral, said processing unit including means for processing said input signals and providing an output signal therefrom such that, when the vehicle speed signal is less than a predetermined value, said start control system is operative such that, (i) when the transmission is in neutral and the throttle is at idle the output signal is effective to instruct the coupling actuating member to cause a friction coupling to assume a disengaged condition and (ii) when the transmission is not in neutral and the throttle is at idle and the brakes are in an engaged condition, the output signal is effective to instruct the brake actuating member to cause the friction coupling to assume a predetermined partially engaged condition.

12. The control system of claim 11 such that, when the throttle is at idle and the transmission is not in neutral and the brakes are in either the engaged or disengaged condition, the output signal is further effective to instruct the throttle control member to adjust the fuel as necessary to hold the engine at a predetermined idle speed.

13. The control system of claim 12 wherein the output signal is further effective to instruct the friction coupling actuating member to cause the friction coupling to stop engagement at a predetermined decrease in engine speed.

14. The control system of claim 12 or 13 such that, when the throttle is not at idler and the transmission is not in neutral, the output signal is effective to instruct the brake actuating member to cause the brakes to disengage at a predetermined rate.

15. The control system of claim 14 wherein the output signal is further effective to instruct the friction coupling actuating member to cause the friction coupling to assume a fully engaged condition.

16. An automatic mechanical transmission start control system for vehicles having brakes and a throttle controlled engine, said transmission having a plurality of gear ratio combinations selectively engageable between a transmission output shaft and a transmission input shaft operatively connected to the engine by means of a selectively engageable and disengageable friction coupling actuating member, an automatic vehicle brake actuating member, a throttle control member, an operator positional change gear selector member, including a neutral position and positions in which said gear ratio combinations are selectively engaged, and an information processing unit having means for receiving a plurality of signals including: (1) an input signal indicative of the position of said throttle control member or of the amount of fuel supplied to the engine; (2) an input signal indicative of vehicle speed; (3) an input signal indicating when the transmission is in neutral, said processing unit including means for processing said input signals and providing an output signal therefrom such that, when the vehicle speed signal is less than a predetermined value, said start control system is operative such that, (i) when the transmission is in neutral and the throttle is at idle the output signal is effective to instruct the coupling actuating member to cause a friction coupling to assume a disengaged condition and (ii) when the transmission is not in neutral and the throttle is at idle and the brakes are in an engaged condition, the output signal is effective to instruct the brake actuating member to cause the brakes to assume a predetermined partially engaged condition.

17. The control system of claim 16 such that, when the throttle is not at idle and the transmission is not in an engaged condition, the output signal is effective to instruct the friction coupling actuating member to cause the friction coupling to assume a predetermined partially engaged condition.

18. The control system of claim 17 wherein the output signal is further effective to instruct the throttle control member to adjust fuel as necessary to hold the engine at a predetermined idle speed.

19. The control system of claim 18 wherein the output signal is further effective to instruct the throttle member to increase the amount of fuel supplied to the engine by a predetermined amount.

20. The control system of claim 19 wherein the output signal is further effective to instruct the friction coupling actuating member to cause the friction coupling to assume a disengaged condition.

21. The control system of claim 20 wherein the output signal is further effective to instruct the brake actuating member to cause the brakes to disengage at a predetermined rate.

22. The control system of claim 21 wherein the output signal is further effective to instruct the friction coupling actuating member to cause the friction coupling to assume a fully engaged condition.

23. The control system of claim 16 such that, when the throttle is at idler and the transmission is not in neutral and the brakes are in either the engaged or disengaged condition, the output signal is effective to instruct the friction coupling actuating member to cause the friction coupling to maintain an engaged condition until the engine speed stops.

24. The control system of claim 23 wherein the output signal is further effective to instruct the throttle control member to adjust fuel as necessary to hold the engine at a predetermined idler speed.

25. The control system of claim 24 wherein the output signal is further effective to instruct the friction coupling actuating member to cause the friction coupling to stop engagement.

26. The control system of claim 23, 24, or 25 such that, when the throttle is not at idler and the transmission is not in neutral, the output signal is effective to instruct the brake actuating member to disengage the brakes at a predetermined rate.

27. The control system of claim 26 wherein the output signal is further effective to instruct the friction coupling actuating member to cause the friction coupling to assume a fully engaged condition.

* * * * *